Patented Jan. 23, 1945

2,367,954

UNITED STATES PATENT OFFICE 2,367,954

PROTECTIVE COMPOSITIONS

John C. Lum, Union, and Thomas J. Keating, Bloomfield, N. J., assignors to Westinghouse Electric & Manufacturing Company, East Pittsburgh, Pa., a corporation of Pennsylvania No Drawing. Application October 24, 1942, Serial No. 463,246

5 Claims. (Cl. 106—173)

This invention relates to protective compositions that may be applied to surfaces of metals and the like to provide for protection of the underlying surfaces from chemical reagents.

In the treatment of metals and other substances with various reagents to produce particular surface conditions, it is frequently necessary to stop-off or prevent the action of the reagents upon certain surface portions of members. Frequently, in treating sheets of metal with acids, alkalies, and other substances to produce a predetermined surface condition, portions of the metal must be shielded from the action of such alkalies and the like in order to maintain the original condition of the metal.

After such treatment, it is ordinarily necessary to remove the stop-off or protective composition from the surfaces to which such composition was applied. The requirements for a satisfactory protective stop-off composition are that the composition be easily applied and easily removed without causing substantial damage to the surfaces being protected. An essential requirement is that the composition protect the underlying surfaces regardless of the reagent or the temperature of the reagent to which the metal is subjected.

The object of this invention is to provide a protective stop-off composition which when applied to members resists the action of acids, alkalies and many other inorganic chemicals and which may be easily applied and readily removed.

A further object of the invention is to provide for a protective stop-off composition which may be applied in the molten state to surface areas of members to protect such areas from the action of hot or cold inorganic chemicals.

Other objects of the invention will in part be obvious and will in part appear hereinafter.

According to this invention, the highly desirable protective composition is prepared by combining ethyl cellulose and cetyl acetamide. The cetyl acetamide which has been employed is obtainable to the trade under the trade-name "Acrawax C." Other sources for the cetyl acetamide are available. Acetamides of aliphatic hydrocarbons having other than 17 carbon atoms; for example aliphatic acetamides of from 12 to 24 carbon atoms may be equally successful in some cases.

A satisfactory protective composition has been produced by combining from 1 to 80 parts of ethyl cellulose with 99 to 20 parts by weight of cetyl acetamide. The most consistent results have been obtained by a composition of approximately 10% ethyl cellulose and 90% cetyl acetamide. The method of combining the two components is to heat the cetyl acetamide to the melting point of around 135° C. and add the ethyl cellulose in powder form. When the mixture has been completely melted, it may be applied to surfaces it is desired to protect. As the proportion of ethyl cellulose is increased, the melting point of the composition increases somewhat. More important though the viscosity of the molten mixture increases considerably with the proportion of ethyl cellulose. A composition of 20% cetyl acetamide and 80% ethyl cellulose is so viscous that it is somewhat difficult to apply to members. Another advantage in favor of the composition having the lower proportions of ethyl cellulose is that the melting point of the mixture is below the point at which ethyl cellulose begins to char. In using other acetamides, such as dodecyl to carnaubyl acetamide, similar proportions with ethyl cellulose may be used.

In some cases, it may be desirable to add small amounts of gums and resins to the mixture in order to reduce the cost or modify the properties of the molten composition such as viscosity. A few percent of Congo gum or Batu resin may be added to replace a part of the ethyl cellulose. Polystyrene may be added in the amounts of up to 5%. A small percentage of cellulose acetate may also be introduced into the composition. Copal, shellac and vinyl chloride polymers may be added with some advantage. The limitation upon the amount of these third components that may be added resides in the lack of compatibility of any large amount of gum or resin with the cetyl acetamide. For most additions less than 10% is the limit of compatibility. Within this limitation it may be advantageous to replace a portion of the ethyl cellulose with the gums or resins to produce changes in viscosity, hardness of the coatings and cost.

The molten composition may be applied to surfaces of members which it is desired to protect by any one of several methods. Sheets of metal may be dipped if the portions to be protected will be covered by the dipping operation. In other cases, a mask may be applied to the metal surfaces, and on brushing or dipping the hot composition will coat the portions of the surfaces presented through the mask. The member whose surfaces have been coated with the composition will be generally so much cooler than the composition that the film of composition will congeal almost immediately and form a tenacious adherent waxy coating. The coating will not be further treated. Members protected with the coating so applied may be treated immediately in any powerful chemical or reagent without affecting the protective coating of the composition.

As an example of the use of the composition, sheet aluminum is dipped in the molten composition. The treated sheets are then subjected to a hot caustic etch whereby the uncoated surfaces are roughened considerably. This is followed by a bright acid dip in order to impart to the etched surfaces a bright surface appearance. Subsequently the aluminum sheet is subjected to a boiling solution of calcium sulphate and calcium oxide in water for fifteen minutes. After the aluminum strip has passed through this sequence of operations, the strip is dipped into a benzene solvent. The benzene solvent causes the coating to swell and loosen from the surfaces of the aluminum strip. The coating then can be peeled off the metal as a substantially unitary strip without leaving any adherent particles of composition behind.

It will be apparent that the composition may be applied extremely rapidly to members, and since no time is necessary in order to dry the coating or to remove solvents, members so treated may be processed at once. The coating may be treated in hot or cold inorganic reagents of all types without causing the coating to peel or crack or otherwise fail. In order to remove the coating, a dip in a solvent causes the coating to swell and loosen to such an extent that the coating may be stripped without any difficulty. It will accordingly be apparent that the composition introduces significant economies into the selective treatment of surfaces of metals and the like.

Since certain changes can be made in the above invention and different embodiments of the invention can be made without departing from the scope thereof, it is intended that all matter contained in the above description shall be interpreted as illustrative and not in a limiting sense.

We claim as our invention:

1. A protective stop composition for application to surfaces in the molten state as a coating comprising 20% to 99% by weight of an acetamide of an aliphatic hydrocarbon of from 12 to 24 carbon atoms and a major proportion of the remainder comprising ethyl cellulose, the coating resistant to the action of acids, alkalies and many organic chemicals.

2. A protective stop composition for application to surfaces in the molten state as a coating comprising 20% to 99% by weight of cetyl acetamide and a major proportion of the remainder comprising ethyl cellulose and a minor proportion of resins and natural gums, melting at about 135° C. and compatible with the cetyl acetamide, the coating resistant to the action of acids, alkalies and many organic chemicals.

3. A protective stop composition for application to surfaces in the molten state as a coating comprising from 99% to 20% by weight of cetyl acetamide and from 1% to 80% by weight of ethyl cellulose, the coating resistant to the action of acids, alkalies and many organic chemicals.

4. A composition suitable for application as a melted coating to surfaces of metal and the like, the hardened coating being inert to the action of hot or cold acids, alkalies and many inorganic chemicals without blistering or peeling, the composition comprising 99 to 20 parts by weight of cetyl acetamide and 1 to 80 parts by weight of ethyl cellulose.

5. A composition suitable for application as a melted coating to surfaces of metal and the like, the hardened coating being inert to the action of hot or cold acids, alkalies and many inorganic chemicals without blistering or peeling, the composition comprising 99 to 20 parts by weight of cetyl acetamide and 1 to 80 parts by weight of ethyl cellulose, and a natural gum or resin in an amount equal to 10% and less of the cetyl acetamide, the gum or resin melting at about 135° C. and compatible with cetyl acetamide.

JOHN C. LUM.
THOMAS J. KEATING.